United States Patent [19]
Brown et al.

[11] Patent Number: 5,402,236
[45] Date of Patent: Mar. 28, 1995

[54] FIBEROPTIC DISPLACEMENT SENSOR USING INTERFEROMETRIC TECHNIQUES

[75] Inventors: Bradley Brown; Douglas J. Thomson, both of Winnipeg, Canada

[73] Assignee: Iders Incorporated, Winnipeg, Canada

[21] Appl. No.: 33,793

[22] Filed: Mar. 18, 1993

[51] Int. Cl.$^6$ ............................ G01P 3/36; G01B 11/02
[52] U.S. Cl. ............................... 356/358; 250/227.27; 250/234
[58] Field of Search ............... 356/345, 358, 356; 358/901; 359/579; 250/227.27, 234

[56] References Cited

U.S. PATENT DOCUMENTS

| | | | |
|---|---|---|---|
| 4,694,160 | 9/1987 | Hoogenboom et al. | 250/203.2 |
| 4,719,341 | 1/1988 | Hoogenboom | 250/203.2 |
| 4,942,767 | 7/1990 | Haritonidis et al. | 250/227.27 |

*Primary Examiner*—Robert P. Limanek
*Assistant Examiner*—David Hardy
*Attorney, Agent, or Firm*—Adrian D. Battison; Stanley G. Ade; Murray E. Thrift

[57] ABSTRACT

Displacement of an object from a sensor is detected using a fiber optic a discharge end of which is arranged adjacent to the space from the object. Light passing along the fiber optic is reflected at the discharge end and is also reflected by the object at a position spaced from the discharge end. These two reflected parts of the light interfere causing an interference pattern. The light path from the discharge end to the object is cyclically varied using a sinusoidal dither obtained either by physical movement or by electro-optical means. This allows the output from the photo diode detecting the return reflected light to be analyzed as an alternating signal varying over time rather than as a simple comparison of absolute values as is used in the conventional techniques.

8 Claims, 8 Drawing Sheets

FIBEROPTIC DISPLACEMENT SENSOR USING INTERFEROMETRIC TECHNIQUES

BACKGROUND OF THE INVENTION

This invention relates to an optical fiber interferometer and particularly to improvements in analysis techniques using an interferometer of this type for detecting movements of or location of an object.

Optical fiber interferometers are well known and use interference techniques that detect very small differences in distance between the end of the fiber and an object. Light from a suitable light source is launched into a fiber and then through a coupler to a discharge end of the fiber. Part of the light exiting from the discharge end is reflected from the fiber to air interface and part of the light passes to the object and is reflected from the object to air interface. A portion of the second part of the light is reflected back into the fiber and passes along the fiber with the first part. These two parts interfere within the fiber in a manner which is dependent upon the phase difference between the two parts which is in turn dependent upon the distance between the end of the fiber and the object.

As is well known, this interference provides the conventional interference pattern in the form of a sinusoidal variation in light intensity as the distance between the object and the fiber is changed. In order to effect a proper analysis of the distance, it is normally necessary to maintain the distance within a relatively narrow band where the sinusoidal wave form is substantially linear, that is well spaced from the peaks. It will of course be appreciated that this detection technique cannot distinguish between a change in distance of X and a change in direction of $$X + \frac{n\lambda}{2}$$

where $\lambda$ is the wave length of the light.

Normally the analysis technique simply involves a comparison of the output signal, as an electrical voltage measured by a photo diode, at one location of the object and the output signal at a second location of the object. Provided the movement of the object between the two location lies substantially in the linear range of the sinusoidal wave pattern, these changes in output signal are substantially proportional to the change in distance.

However these analysis techniques are relatively limited leading to a limitation in the effectiveness of the interferometer.

It is one object of the present invention, therefore, to provide an improved method of detecting the location of an object using fiber interferometer techniques.

According to the invention, therefore, there is provided a method of detecting a location of an object comprising providing an optical fiber having a light inlet end and a light discharge end, providing a light source at the light inlet end for transmitting light along the fiber, said light source having a primary wave length $\lambda$, locating the light discharge end adjacent to but spaced from the object to define a fiber to air interface at the discharge end and an air to object interface at the object such that light transmitted along the optical fiber from the inlet end to the discharge end has a first part which is reflected from the fiber to air interface back along the fiber and a second part which is reflected from the air to object interface back into and along the fiber, the distance D between the object and the discharge end being arranged such that the first part and the second part interfere in a manner depending upon the phase difference therebetween, detecting with respect to time variations in the quantity of light reflected, and cyclically varying the optical path length between the object and the discharge end of the fiber, the cyclical variation having a predetermined frequency and a predetermined amplitude, and analyzing the changes in the quantity of light reflected with respect to time to determine information concerning the location of the object.

The technique of the present invention can therefore involve a cyclical variation or sinusoidal dither to the optical path length between the sample and the discharge end of the fiber with that dither having a carefully controlled frequency and amplitude. This dither can be obtained by physical movement of one of the sample and the discharge end or by electro-optical means or by other means. This allows in general terms the output from the photo diode of the interferometer to be analyzed as an alternating signal varying over time rather than as a simple comparison of absolute values as used in the conventional techniques.

This variation as an alternating signal over time can be most effectively analyzed using AC circuitry techniques to detect various aspects of the wave form so generated as described in detail hereinafter.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
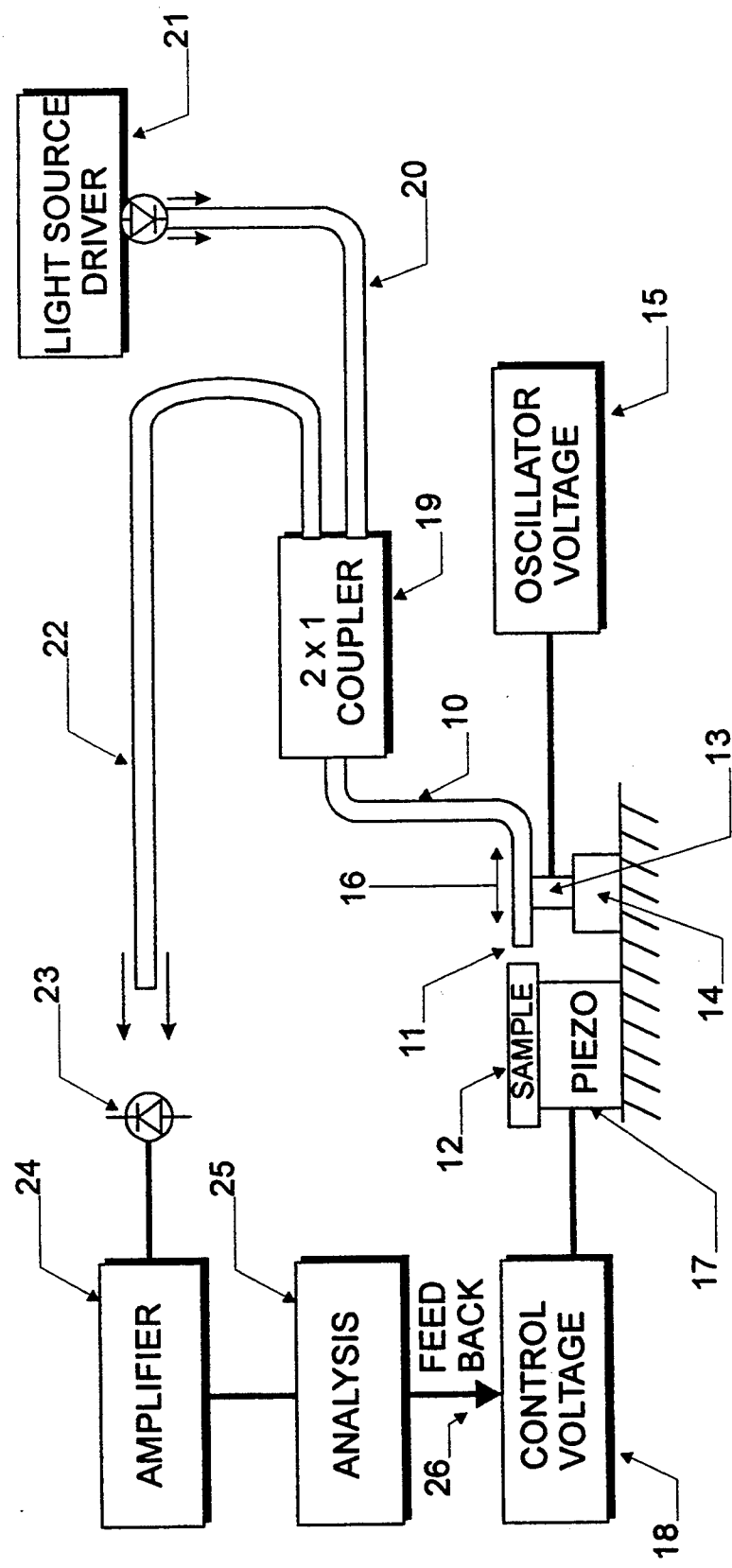
FIG. 1 is a schematic illustration of an optical fiber interferometer of a type which which the present invention is concerned.
Figure 2:
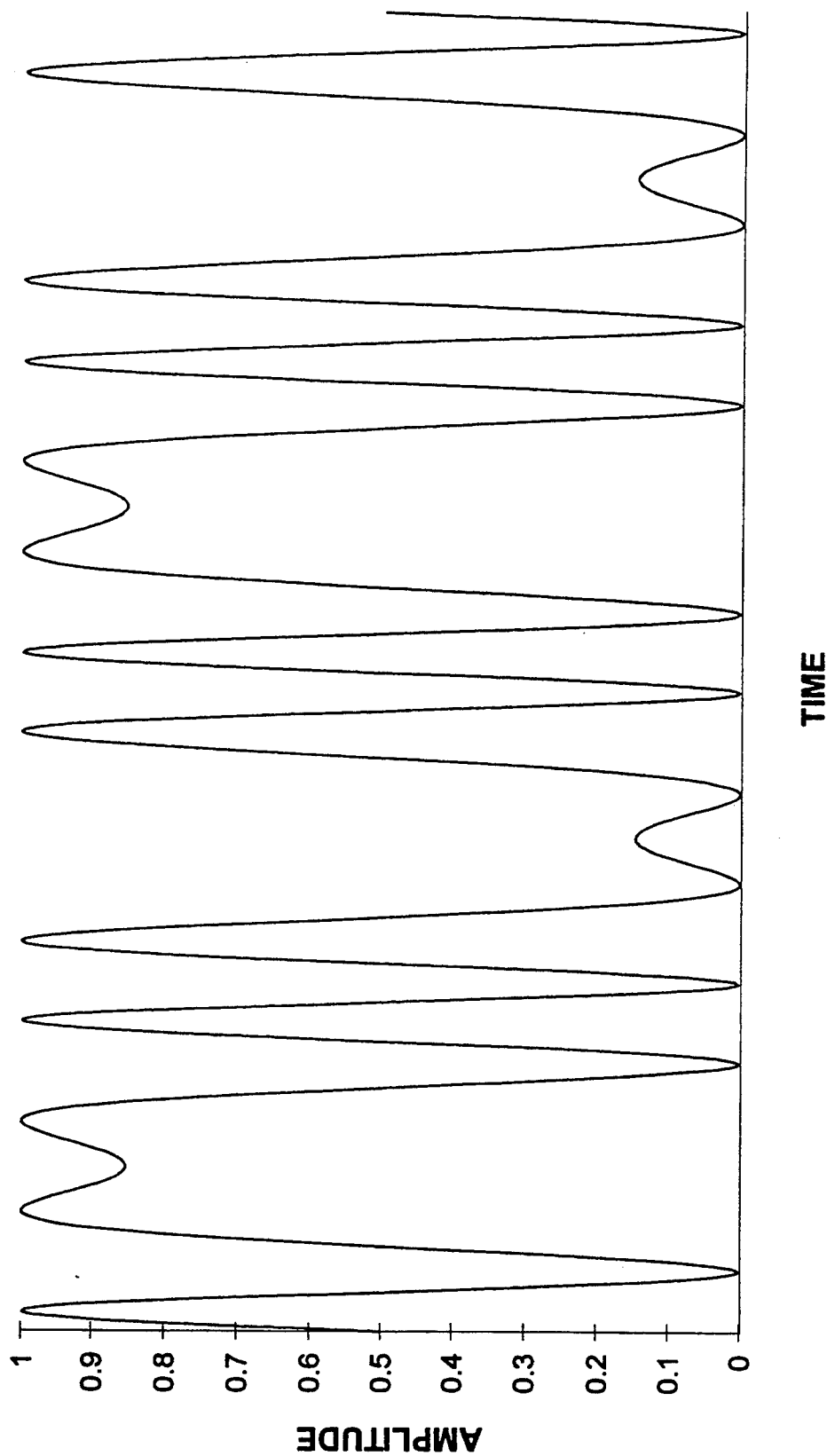
FIG. 2 is a graph showing the output wave form of the light amplitude detected by the interferometer showing the maximum and minimum output positions and the half power (0.5) crossing point.

In FIG. 1 is shown is chematically a mechanical construction according to the present invention of an optical fiber interferometer including a main optical fiber 10 having a discharge end 11 arranged to be located closely adjacent a sample 12, the location of which is to be detected. The discharge end 11 of the optical fiber is mounted upon an oscillator 13 carried upon a suitable mounting support 14. The oscillator 13 is preferably a piezo electric crystal which is powered by an oscillator voltage control unit 15 to provide oscillating movement of the end 11 in the direction of the arrows 16.

In one example the sample 12 is mounted upon a control support 17 which operates to move the sample to a required location. In the example shown the mounting support 17 comprises also a piezo electric crystal which can be arranged to move the sample in two directions of an X and Y coordinate system. The modulating support 17 is actuated by a control voltage system 18 providing the necessary actuating voltages.

An inlet end of the fiber 10 is connected to a 2×1 coupler 19 which receives light along an input fiber 20 from a light source 21. The light source can be of the type disclosed in copending application Ser. No. 004,903 filed Jan. 21, 1993, disclosure of which is incorporated herein by reference.

The coupler 19 is also connected to a discharge fiber 22 communicating light to a photo diode 23 which generates a voltage proportional to the light received by way of reflection along the fiber 10. The voltage is connected to an amplifier 24 which generates a voltage wave form of the type shown hereinafter which in turn is communicated to an analysis unit 25 described in more detail hereinafter. The analysis unit can be used to generate feedback along a control coupling 26 to the control voltage system 18. In this way the movement of the sample under the actuation of the mounting system 17 can be detected and controlled to maintain an accurate calibration of the movement system.

The oscillator 13, 15 is arranged to generate movement of the discharge end 11 of the fiber in a direction to increase and decrease the distance between the end of the fiber and the point on the sample to be detected.

As an alternative (not shown) the optical path length between the sample and the discharge end can be varied by other than mechanical movement, for example by electro-optical means.

Figure 7:
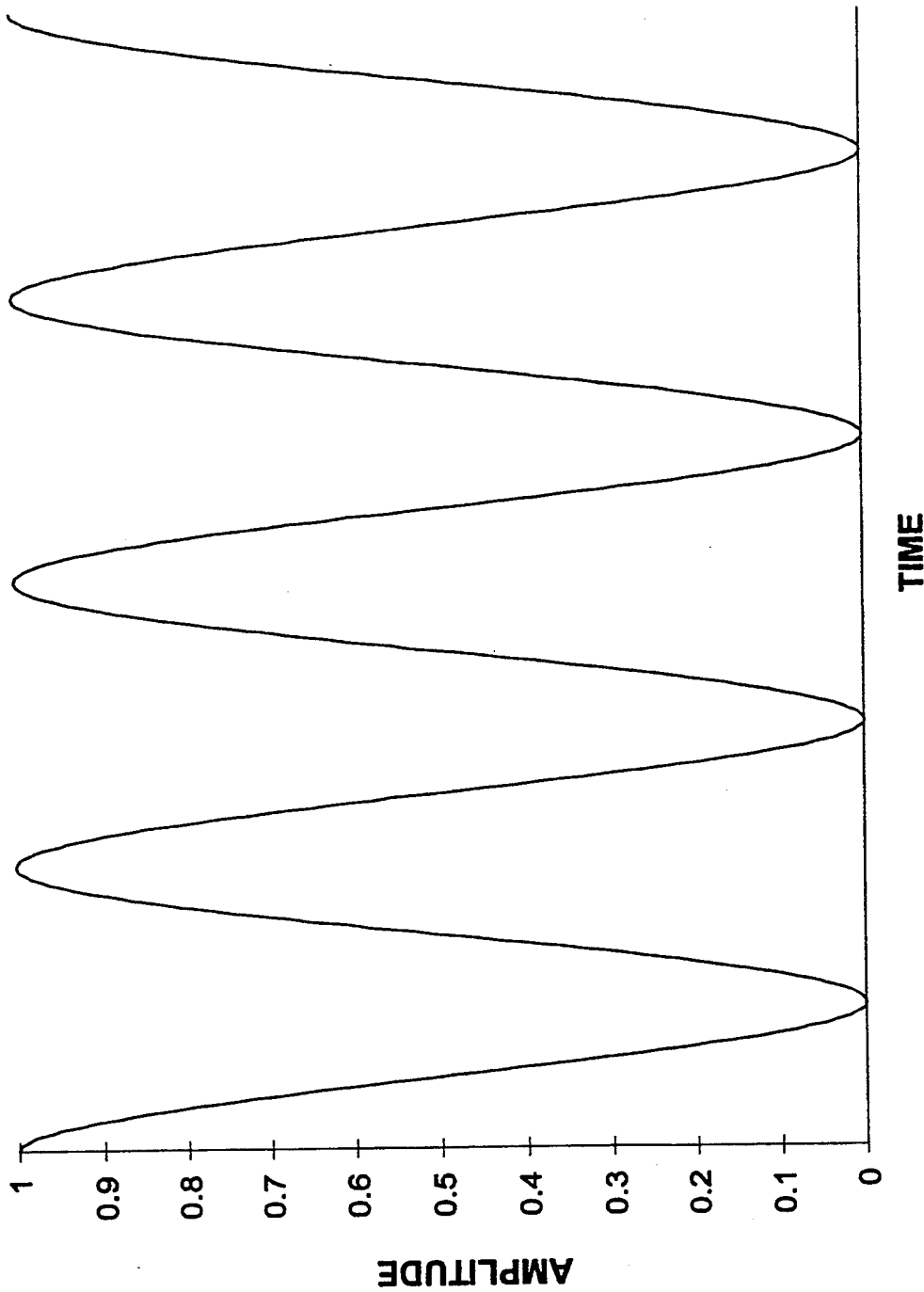

As is well known optical fiber interferometers operate by detecting the reflected light which is generated at the discharge end to air interface and from the air to sample interface. Depending upon the distance between these two interfaces, interference occurs in the reflected light which is dependent upon the wave length of the light communicated through the fiber. The signal output versus the discharge end to sample optical path length is shown in FIG. 7. Here the signal is a maximum at spacings of $$\frac{n\lambda}{2}$$

$$\frac{n\lambda}{2} + \frac{\lambda}{4}.$$

Half power points occur at spacings of $$\frac{n\lambda}{2} \pm \frac{\lambda}{8}.$$

Generally it is desirable to maintain as far as possible the movement to be detected within the linear range of the sinusoidal interference pattern that is in the area of the half power point well spaced from the peaks. However in this arrangement the oscillator 13, 15 is arranged to generate a movement of the discharge end 11 in many examples which is greater than $\lambda/2$ where $\lambda$ is the wave length of the light. This amount of movement therefore acts to translate the discharge end beyond the peaks of the interference pattern and this movement could therefore normally be expected to prevent effective analysis. However, surprisingly the present inventors have determined that an effective analysis of the location of the discharge end relative to the sample can be effected where the discharge end is oscillated in this manner.

Analysis of the output to determine valuable information can be effected using time domain or frequency domain techniques.

Figure 3:
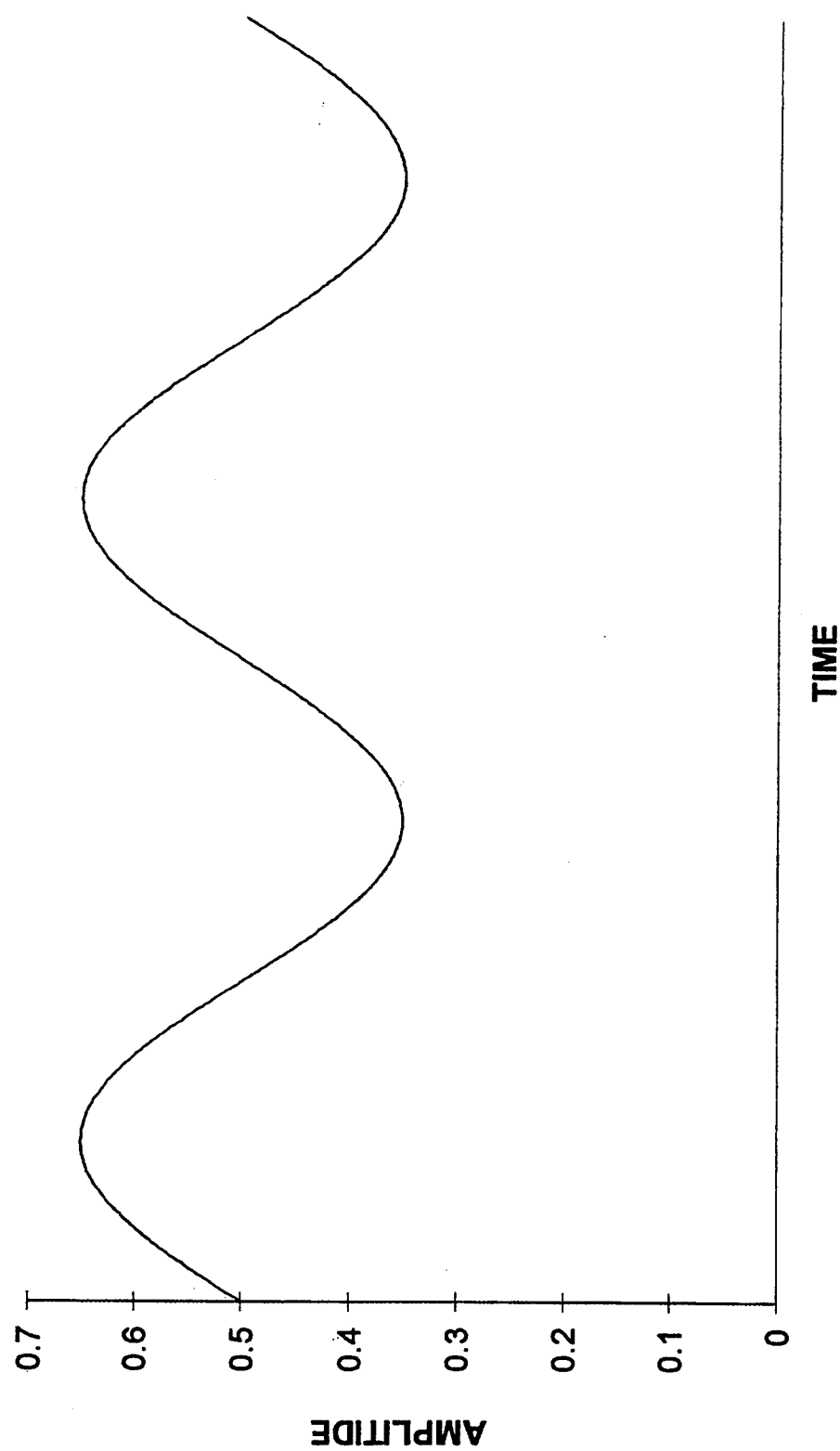
FIGS. 3 to 8 show various graphs of the variation of amplitude with respect to time for specific dither examples, used for the analysis as set forth hereinafter.
Figure 4:
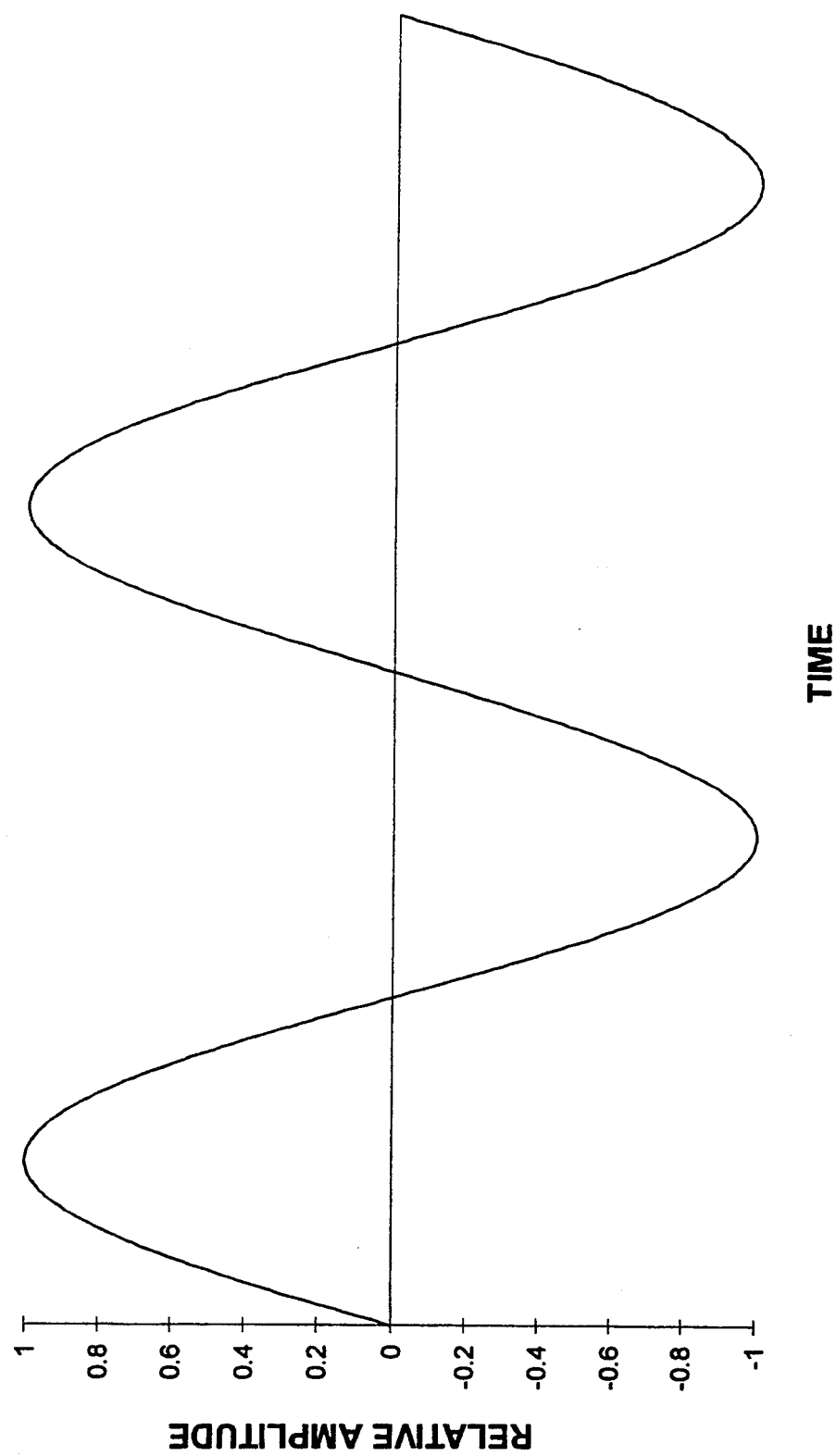
Figure 5:
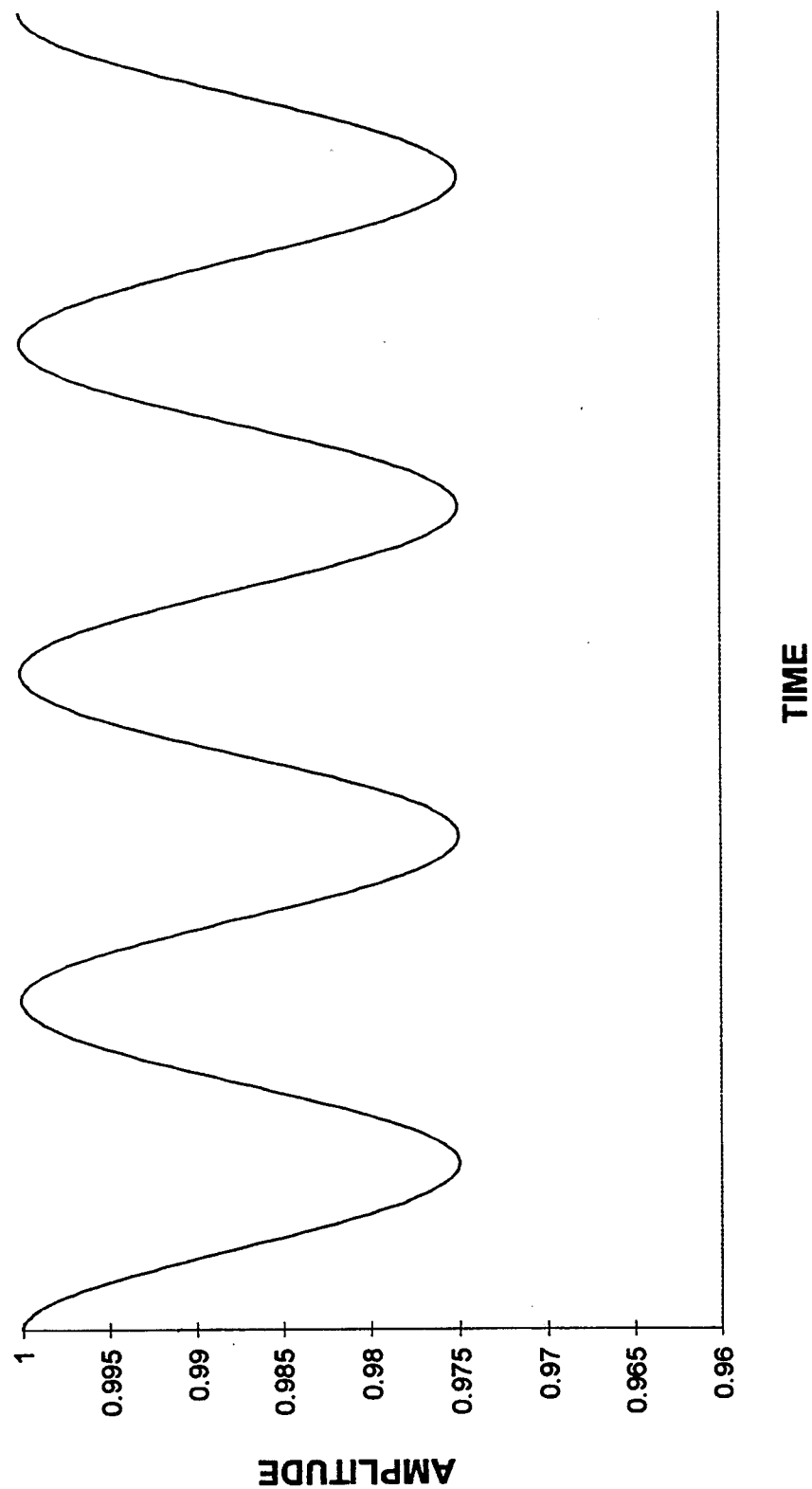
Figure 6:
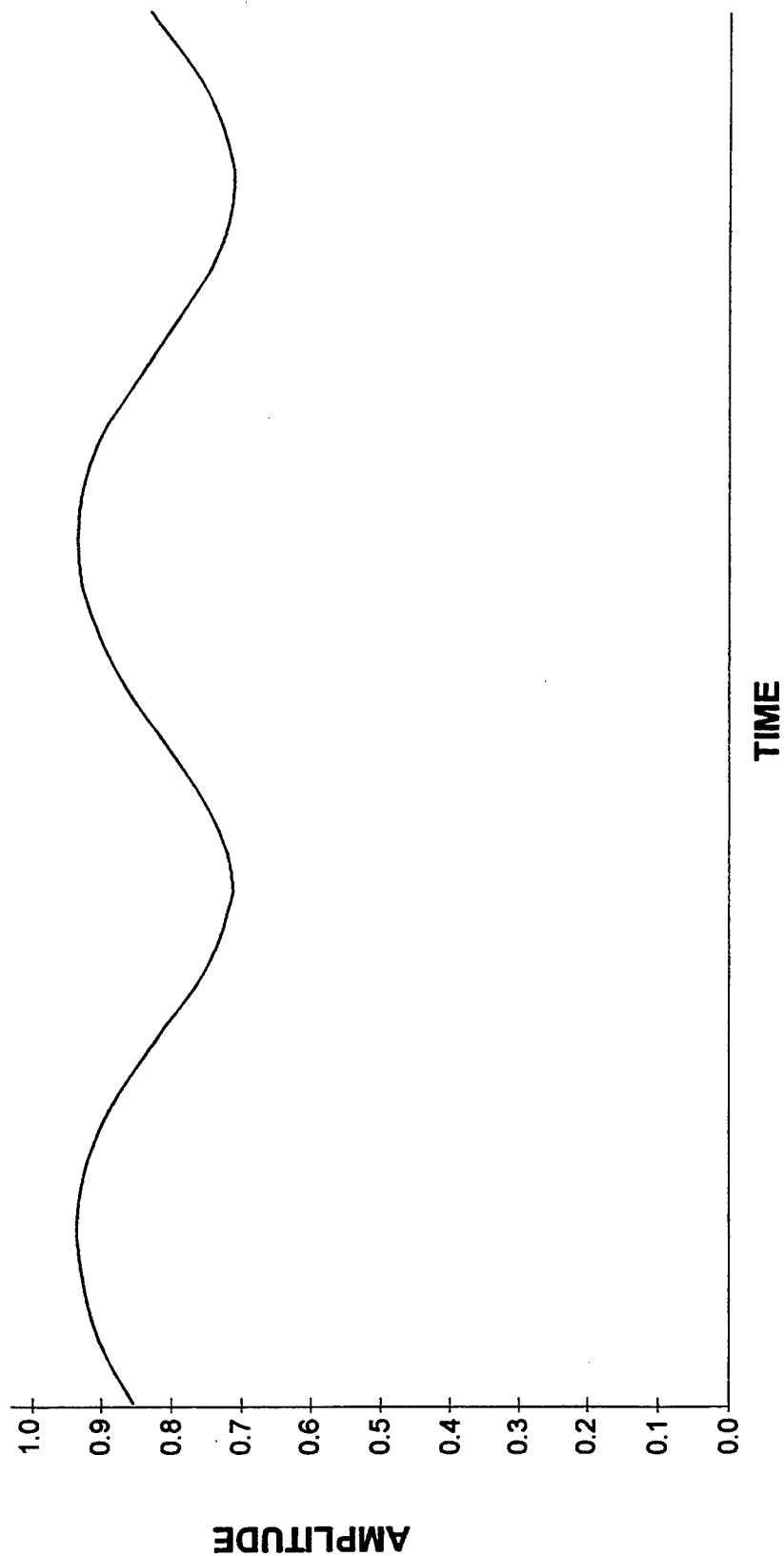

With the oscillation of the discharge end, the sample position relative to the discharge end can be measured by analyzing the amplitude versus frequency of the signal from the photodiode. Consider the change in the signal from the photo diode as discharge end to fiber spacing is changed, with the discharge end dithering an amount less than $\lambda/4$. If it dithers about a half power point (as shown in FIG. 4 then an output as shown in FIG. 3 is observed. Note that this signal is at the same frequency as the dither signal. If the discharge end is dithered about a maximum signal point an output signal as shown in FIG. 5 is observed. Note that this signal is substantially at twice the frequency of the dither signal. The reason for this effect can be easily understood by considering what happens during a single dither cycle, starting at a low point in the cycle. As the discharge end starts to move the signal increases to a maximum when the relative dither passes through zero. The signal then begins to decrease as the discharge end has now passed the maximum signal point. The same thing happens on the downward half of the dither cycle. This obviously results in two cycles being generated in the output signal for each cycle of the dither. Dither about a point between these two points results in an output signal shown in FIG. 6 that is a mix of both signals at the frequency of the dither signals at twice the frequency of the dither and other frequencies. The relative position of the discharge end with respect to the sample can be measured by measuring the relative amplitudes of these frequency components.

These techniques can be extended to measure the movement of the discharge end by distances greater than $\lambda/2$ by tracking of the movement over time. Typically the separation between the discharge end relative to the sample is determined at least once every dither cycle. As long as discharge end has not moved more than $+\lambda/4$ between the discharge end and the sample can be unambiguously tracked over time.

Figure 8:
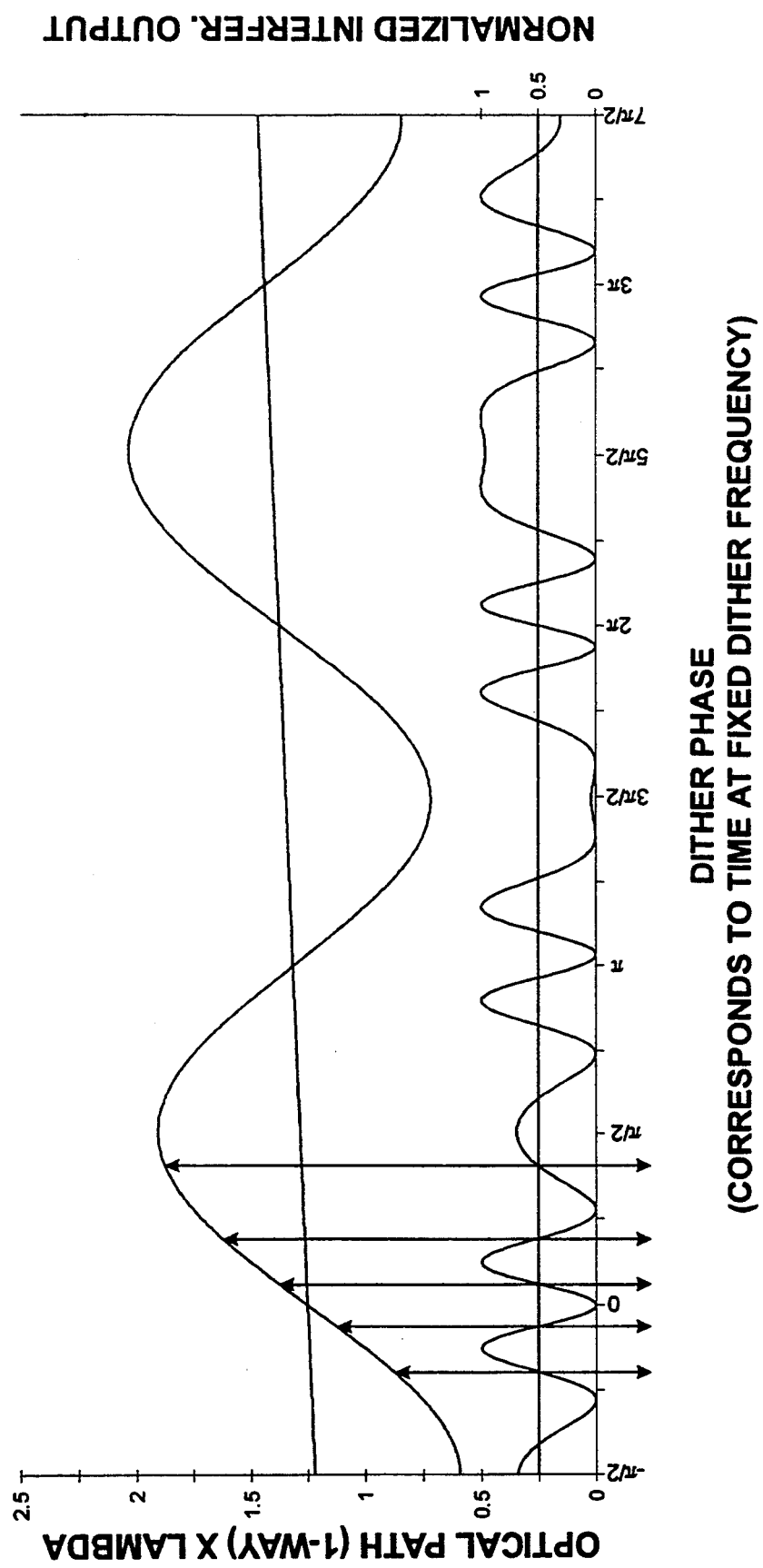

Another embodiment of this analysis technique is a time domain analysis. The relative position of the sample, as well as higher order information such as sample velocity and acceleration, may be determined by observation of the times that the interferometer photo diode output signal crosses the half power threshold. An example is illustrated in FIG. 8. Limiting the range of relative motion $\Delta x$ to be between 0 and $\lambda/2$ ($\lambda/2 < \Delta x \geq 0$) and designating half power threshold crossing times based on their relationships to the dither signal as shown in FIG. 8, the following equations result:

$$A\sin(2\pi t_0/\tau) + \Delta x + t_0 v = 0$$

$$A\sin(2\pi t_1/\tau) + \Delta x + t_1 v = \lambda/4$$

$$A\sin(2\pi t_1/\tau) + \Delta x + t_1 v = \lambda/2$$

Where A is the amplitude of the dither, $\Delta x$ is the relative position of the target at $t=0$, v is the velocity of the target, and $\tau$ is the period of the dither cycle. Extraction of A, the amplitude of the dither, allows the dither oscillator amplitude to be maintained at a consistent value through a feedback control system. Note that the half power crossing times within each half dither cycle ($-\pi$ to $\pi$, $\pi$ to $2\pi$, etc.) are subscripted based on their time of occurrence with respect to the 0 degree phase ($t=0$) on the dither signal. Half power crossing times are subscripted with incrementing numbers starting at 1 after t=0 (t≠0). Preceding half power crossing times are subscripted with negative numbers. The preceding equations are simply an example. More generally a set of simultaneous equations may be constructed, each with the form:

$$\Delta \sin(2\pi t_n/t) + \Delta x(t_n) = n\lambda/4$$

Each equation reflects the requirement that the total optical path length, from discharge end to sample, must be a multiple of $\lambda/2$ (plus some offset) in order for a half power crossing to have occurred. The offset may be safely ignored since the measurement technique would typically be used in a relative mode.

Two ½ power crossing times, yielding two equations, are required to determine $\Delta x$, assuming that the sample is stationary. Three half power crossing times yield three equations, allowing determination of the sample position when the sample velocity is non-zero. Similarly large numbers of half power crossings in a dither half cycle allow more accurate determination of the position and trajectory of the sample. Based on a minimum requirement of two half power crossings in each half dither cycle, the dither amplitude must be greater than $\lambda/2$ ($A > \lambda/4$) in order for this analysis technique to work.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method of detecting a location of an object comprising providing an optical fiber having a light inlet end and a light discharge end, providing a light source at the light inlet end for transmitting light along the fiber, said light source having a primary wave length $\lambda$, locating the light discharge end adjacent to but spaced from the object by a distance D, allowing variations in the distance D, defining a fiber-to-medium interface at the discharge end and a medium-to-object interface at the object such that light transmitted along the optical fiber from the inlet end to the discharge end has a first part which is reflected from the fiber-to-medium interface back along the fiber and a second part which is reflected from the medium-to-object interface back into and along the fiber, the distance D between the object and the discharge end being arranged relative to the primary wave length $\lambda$ such that the first part and the second part interfere to form interference patterns having variation in light intensity depending upon a phase difference therebetween caused by said variations in the distance D, detecting with respect to time said variations in the intensity of light reflected, causing a cyclical variation in a path length of the second part of the light, the cyclical variation having a predetermined frequency and a predetermined amplitude, and analyzing the variation in the intensity of light reflected to determine said variations in the distance D.

2. The method according to claim 1 wherein the cyclical variation is applied to said path length of the second part of the light between the discharge end and the object.

3. The method according to claim 1 wherein the predetermined amplitude is constant.

4. The method according to claim 1 wherein the predetermined frequency is constant.

5. The method according to claim 1 wherein the predetermined amplitude is greater than $\lambda/2$.

6. The method according to claim 1 including detecting half power crossing points between maximum and minimum values, wherein the half power crossing points are used to extract sample position/trajectory information.

7. The method according to claim 1 including detecting half power crossing points between maximum and minimum values, wherein the half power crossing points are used to extract information concerning the amplitude of said cyclical variation in order to allow feedback control of the amplitude.

8. The method according to claim 1 wherein the step of analyzing comprises measuring an amplitude and a phase of the variation in intensity at the predetermined frequency and of multiples of the predetermined frequency and using ratios of the measured amplitudes and the measured phases to determine said variations in distance D.

* * * * *